United States Patent
Alperin et al.

(10) Patent No.: US 7,200,861 B2
(45) Date of Patent: Apr. 3, 2007

(54) METHOD AND SYSTEM FOR VALIDATING PHYSICAL ACCESS TO AN INFORMATION HANDLING SYSTEM

(75) Inventors: Joshua N. Alperin, Round Rock, TX (US); Benjamen G. Tyner, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 820 days.

(21) Appl. No.: 10/401,294

(22) Filed: Mar. 27, 2003

(65) Prior Publication Data

US 2004/0193883 A1 Sep. 30, 2004

(51) Int. Cl.
H04L 9/32 (2006.01)
(52) U.S. Cl. .................. 726/2; 726/3; 726/34
(58) Field of Classification Search .......... 713/300, 713/310, 322, 340, 182; 726/2–4, 7, 21, 726/27–30, 34, 36
See application file for complete search history.

(56) References Cited

U.S. PATENT DOCUMENTS 5,506,573 A * 4/1996 Ewing et al. ............... 340/644
5,622,064 A 4/1997 Gluskoter et al. ............. 70/14
6,507,273 B1 * 1/2003 Chang et al. ................ 340/3.1
2003/0005300 A1 1/2003 Noble et al. ................ 713/172
2003/0110372 A1 6/2003 Proudler ..................... 713/150

\* cited by examiner

Primary Examiner—Hosuk Song
(74) Attorney, Agent, or Firm—Hamilton & Terrile, LLP; Robert W. Holland

(57) ABSTRACT

An information handling system security system validates authorization to selected information by establishing physical access of a user to the information handling system through activation by the user of a power switch of the information handling system. Upon detection of an attempt to access the limited access information, a trusted platform module disables power functionality of the power switch and enables a physical access validation mode that validates physical access of a user to the information handling system before allowing access to the limited access information. Failure to confirm physical access by activation of the power switch precludes access to the information. Validation of physical access by activation of the power switch allows access to the information and returns normal power functionality to the power switch.

20 Claims, 2 Drawing Sheets

METHOD AND SYSTEM FOR VALIDATING PHYSICAL ACCESS TO AN INFORMATION HANDLING SYSTEM

BACKGROUND OF THE INVENTION

1. Field of the Invention

The present invention relates in general to the field of information handling system security, and more particularly to a method and system for validating physical access to an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often process and store confidential information and perform sensitive functions. Businesses and individuals often use a variety of security measures to protect sensitive information and functions from unauthorized use. For instance, information handling systems are typically protected from theft or unauthorized access by physical security and passwords. However, information handling systems that interact with a network may be subjected to malicious attacks launched from outside of the physical location of the information handling system. For example, hackers use the Internet to launch malicious attacks on information handling systems from virtually anyplace. Although network security systems such as firewalls provide some protection from network-based malicious attacks, a determined hacker is often able to penetrate network security systems to obtain sensitive information or disrupt information handling system operations.

In an effort to improve security of information handling systems, the Trusted Platform Computing Alliance has begun development of a specification that defines security measures for information handling systems. One proposed security measure is a validation by a user of physical access to an information handling system before allowing access by the user to information or applications of the information handling system. Validation of physical access by a user helps to prevent remote attacks launched through networks since a user of a remote information handling system generally cannot physically access the attacked information handling system. One difficulty with validation of physical access is that normal input devices, such as keyboards, may be imitated through a remote attack and thus do not provide a secure validation point. Even power cycling of an information handling system is not sufficient since power cycling may be performed via local area network commands. The Trusted Platform Computing Alliance specification suggests that jumpers and DIP switches be incorporated in information handling systems as a system that authenticates physical access in a manner that cannot be performed remotely. However, such a system calls for access to within the chassis of an information handling system and thus presents a potential safety hazard if a user is asked to access electronic components during operation of the information handling system.

SUMMARY OF THE INVENTION

Therefore a need has arisen for a method and system which verifies physical access by a user to an information handling system.

In accordance with the present invention, a method and system are provided which substantially reduce the disadvantages and problems associated with previous methods and systems for verification of a user's physical access to an information handling system. Activation of a power switch validates physical access by a user to an information handling system.

More specifically, a trusted platform module provides security for an information handling system by verifying a user's physical access to the information handling system before permitting access to limited access information or functions of the information handling system. A secured access detector monitors information and functions performed by the information handling system to detect requests for limited access information associated with a requirement for validation of physical access by a user of the information handling system. If a request for limited access information is detected, a power switch function module commands a power switch controller to disable power functionality of the power switch so that activation of the power switch will not turn off power to the information handling system. A physical access validation module then displays a request for the user to activate the power switch to validate the presence of the user at the information handling system. If the user activates the power switch in a predetermined time, then the physical access validation module permits access to the information and commands the power switch controller to return the power functionality to the power switch. If the power switch is not activated to validate physical access, then appropriate defensive measures are taken to protect the limited access information.

The present invention provides a number of important technical advantages. One example of an important technical advantage is that physical access of a user to an information handling system is validated by activation of the power switch. The use of the power switch provides validation of physical access from outside the chassis of the information handling system without the inclusion of additional hardware components. Users are thus able to verify physical access in an intuitive manner without increased risk of injury to the user or damage to the information handling system.

BRIEF DESCRIPTION OF THE DRAWINGS

The present invention may be better understood, and its numerous objects, features and advantages made apparent to those skilled in the art by referencing the accompanying

DETAILED DESCRIPTION

Information associated with an information handling system is secured by validating physical access to the information handling system through activation of the power switch at the information handling system before allowing access to the information associated with the information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
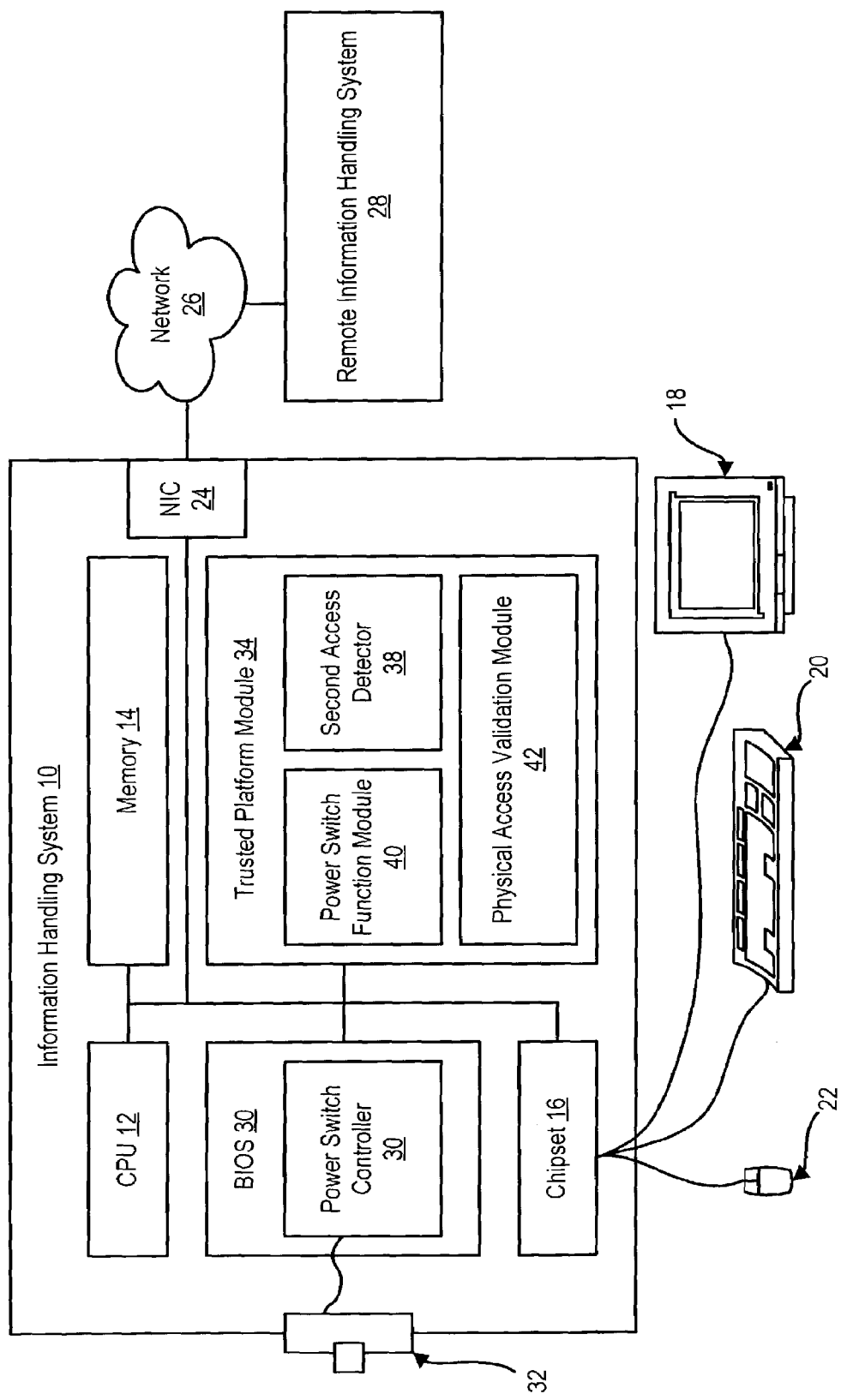
FIG. 1 depicts a block diagram of an information handling system configured to validate physical access.

Referring now to FIG. 1, a block diagram depicts an information handling system 10 configured to provide security for selected information by validation of physical access of a user to information handling system 10. Information handling system 10 includes a number of information processing components, such as a CPU 12, memory 14, and chipset 16 which supports communication with peripheral devices including a monitor 18, keyboard 20 and mouse 22. A NIC 24 provides an interface to a network 26, such as by the Ethernet protocol, to allow communication with one or more remote information handling systems 28. A BIOS 30 coordinates control of and communication with physical devices such as a power switch 32 that is pressed to turn power on and off for information handling system 10.

In order to provide validation of physical access to information handling system 10, a trusted platform module 34 interfaces with the information processing components, including a power switch controller 36 associated with BIOS 30, in order to selectively configure power switch 32 to validate physical access of a user to information handling system 10. A secured access detector 38 of trusted platform module 34 detects attempts to access predetermined information defined as having a limited access and places a hold to temporarily prohibit access to the information. For instance, secured access detector 38 detects calls to run one or more of a selected set of applications or access attempts to one or more set of files having sensitive information defined as subject to limited access to a user within the physical proximity of information handling system 10. Access attempts to limited access information that are detected by secured access detector 38 result in a communication to a power switch function module 40 to alter the functionality of power switch 32 for validation of physical access by a user to information handling system 10. Power switch function module 40 commands power switch controller 30 to disable normal power functions of power switch 32 and enable physical access validation functionality. Power switch controller 30 communicates the initiation of the physical access validation mode to power switch function module 40 and then awaits an activation of power switch 32 to validate physical access of the user to information handling system 10.

Power switch function module 40 communicates the initiation of the physical access validation mode for power switch 32 to a physical access validation module 42, which communicates the need for validation of physical access to the user. For instance, a graphical user interface displayed on display 18 informs the user that an attempt to access sensitive information was detected and that access to the sensitive information is limited by a requirement for validation of physical access by the user to information handling system 10 through activation of power switch 32. Physical access validation module 42 sets a timer for a predetermined time during which the user may activate power switch 32. If power switch 32 is activated, power switch controller 30 communicates the activation to physical access validation module 42 through power switch function module 40. If activation occurs before expiration of the timer, user physical access is validated and physical access validation module 42 commands secured access detector 38 to permit access to the information. Power switch function module 40 then commands power switch controller 36 to return normal functionality to power switch 32. If activation occurs after the timer or is not detected, user physical access is not validated and physical access validation module 42 may take a number of defensive steps such as preventing access to the requested information, locking out network access to information handling system 10, shutting down information handling system 10, and displaying a warning of an unauthorized access attempt at display 18. The defensive measures taken by physical access validation module 42 may vary dependent upon the type of information subject to non-validated access attempt. For instance, an attempt to re-flash the BIOS or otherwise effect the operation of the security system without a physical access validation will result in shutdown of information handling system 10 whereas non-validated attempts to access specific information may simply result in denial of access to that information.

Figure 2:
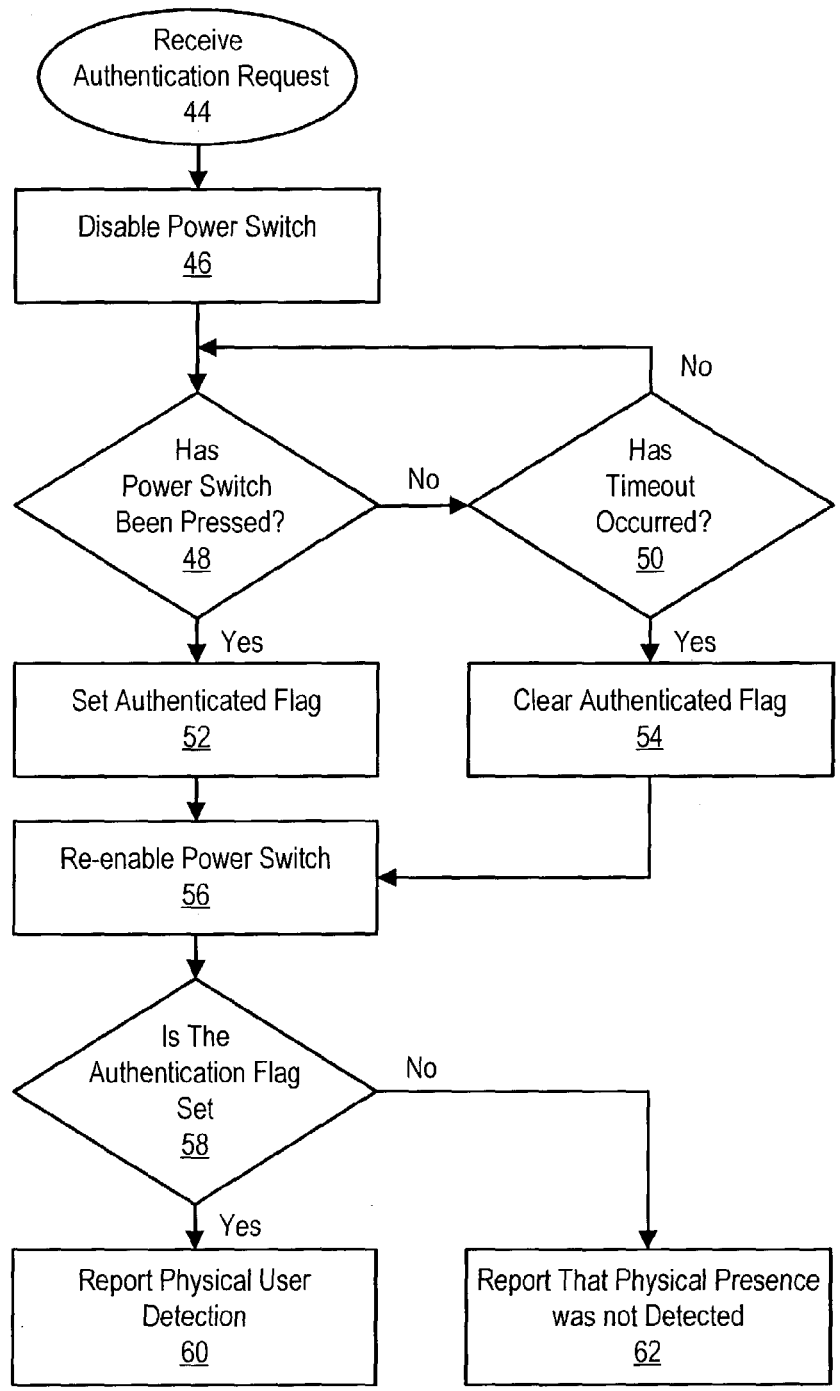
FIG. 2 depicts a flow diagram of a method for validation of physical access to an information handling system.

Referring now to FIG. 2, a flow diagram depicts a process for validation of physical access to an information handling system through activation of a power switch. The process begins at step 44 with the receipt of a request for validation of physical access sent to the BIOS power switch controller. At step 46, power functionality of the power switch is disabled so that activation of the power switch will not turn off power to the information handling system. At step 48, a determination is made of whether the power switch has been pressed to validate physical access. If the power switch is activated to validate physical access, the process continues to step 52 to set an authenticated flag. If the determination at step 48 is no, the process continues to step 50 to determine if a timer timeout has occurred. If the timeout has not occurred the process returns to step 48 and repeats until either a power switch activation occurs or timeout occurs. If the determination at step 50 is yes, then timeout has occurred without activation of the power switch and the process continues to step 54 to clear the authenticated flag. At step

56, the power functionality of the power switch is re-enabled so that a user may shutdown the information handling system if desired. At step 58, a determination is made of whether the authenticated flag is set. If yes, at step 60 a validation of a physical user is reported to the information handling system. If no at step 58, the process continues to step 62 to report that physical presence of a user at the information handling system was not validated.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   information processing components disposed in the housing and operable to run applications;
   a power switch accessible at the housing and interfaced with the information processing components, the power switch operable to turn power on and off to the information processing components; and
   a trusted platform module interfaced with the information processing components and the power switch, the trusted platform module operable to selectively configure the power switch to restrict operation of the information processing components without validation of physical access of a user by a physical activation of the power switch.

2. The information handling system of claim 1 further comprising plural applications stored on the information processing components and wherein the trusted platform module is further operable to require validation by physical access for the information processing components to run a selected one or more of the applications.

3. The information handling system of claim 2 wherein the information processing components comprises a BIOS having non-volatile memory and an application that requires validation by physical access comprises a tool for re-flash of the BIOS non-volatile memory.

4. The information handling system of claim 1 wherein the information processing components comprises a power switch controller interfaced with the power switch, the power switch controller having power on and off functionality to turn power on and off to the information processing components, and wherein the trusted platform module is further operable to disable the power on and off functionality during validation of physical access.

5. The information handling system of claim 4 wherein the trusted platform module is further operable to restore the power on and off functionality upon validation of physical access.

6. The information handling system of claim 4 wherein the trusted platform module is further operable to restore the power on and off functionality after a predetermined time.

7. The information handling system of claim 1 further comprising a graphical user interface associated with the trusted platform module and operable to display user instructions for validation of physical access by activation of the power switch.

8. A method for validating physical access to an information handling system, the method comprising:
   generating a request for validation of physical access to an information handling system;
   disabling the power switch from power control of the information handling system;
   enabling the power switch to validate physical access to the information handling system;
   requiring activation of the power switch to validate physical access to the information handling system; and
   re-enabling the power switch with power control of the information handling system upon activation of the power switch to validate physical access.

9. The method of claim 8 further comprising:
   determining that a predetermined time has elapsed after the generating of a request for validation;
   disabling one or more applications of the information handling system; and
   re-enabling the power switch with power control of the information handling system.

10. The method of claim 9 wherein generating a request further comprises:
    defining one or more applications of an information handling system as having limited access; and
    detecting a request to access a limited access application.

11. The method of claim 10 wherein disabling one or more applications further comprises:
    disabling the application associated with the access request.

12. The method of claim 9 wherein disabling one or more applications further comprises:
    disabling operation of the information handling system except for an application to warn of an unauthorized intrusion attempt.

13. The method of claim 8 wherein generating a request further comprises generating a request to the BIOS to alter power switch functionality.

14. The method of claim 13 wherein generating a request further comprises generating a request for validation of physical access in response to an access to re-flash the BIOS of the information handling system.

15. The method of claim 8 wherein generating a request further comprises generating a request for validation of access in response to an access to re-program security measures of the information handling system.

16. A security system comprising:
    a secured access detector operable to detect an access attempt to predetermined secure information of an information handling system;
    a power switch function module interfaced with the secured access detector and operable to command a power switch of the information handling system to enable a physical access validation mode upon detection of the access attempt and to disable the physical access validation mode upon validation of physical access by activation of the power switch; and
    a physical access validation module interfaced with the power switch function module and the secured access detector, the physical access validation module operable to authorize access to the predetermined secure information upon detection of validation of physical access at the power switch.

17. The information handling system of claim 16 wherein the predetermined secure information comprises one or more applications operable to run on the information handling system.

18. The information handling system of claim 16 wherein the physical access validation module is further operable to preclude access to the predetermined secure information absent validation of physical access at the power switch.

19. The information handling system of claim 16 wherein the physical access validation module is further operable to preclude access to all applications of the information handling system absent validation of physical access at the power switch within a predetermined time.

20. The information handling system of claim 19 wherein the physical access validation module is further operable to display a user interface warning of an unauthorized access attempt absent validation of physical access at the power switch within the predetermined time.

* * * * *